(12) United States Patent
Lee et al.

(10) Patent No.: US 11,812,156 B2
(45) Date of Patent: Nov. 7, 2023

(54) DEVICE AND METHOD FOR REDUCING BACKLIGHT EFFECT ON A CAMERA OF A ROBOT

(71) Applicants: HYUNDAI MOTOR COMPANY, Seoul (KR); KIA CORPORATION, Seoul (KR)

(72) Inventors: Seung Yong Lee, Uiwang-si (KR); Jae Ho Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/745,537

(22) Filed: May 16, 2022

(65) Prior Publication Data

US 2023/0049281 A1 Feb. 16, 2023

(30) Foreign Application Priority Data

Aug. 4, 2021 (KR) .................. 10-2021-0102738

(51) Int. Cl.
*H04N 23/71* (2023.01)
*H04N 23/57* (2023.01)
*H04N 17/00* (2006.01)

(52) U.S. Cl.
CPC .......... *H04N 23/71* (2023.01); *H04N 17/002* (2013.01); *H04N 23/57* (2023.01)

(58) Field of Classification Search
CPC ...... H04N 23/71; H04N 17/002; H04N 23/57; H04N 23/73; H04N 23/60; H04N 23/72; H04N 23/76; H04N 23/88
See application file for complete search history.

(56) References Cited

U.S. PATENT DOCUMENTS

| 8,115,829 | B2 | 2/2012 | Ha et al. | |
|---|---|---|---|---|
| 9,137,450 | B2 | 9/2015 | Osawa | |
| 9,736,391 | B2 | 8/2017 | Du et al. | |
| 2010/0097492 | A1 | 4/2010 | Ha et al. | |
| 2011/0242366 | A1* | 10/2011 | Yamashita | G03B 7/091 348/E5.04 |
| 2013/0258175 | A1 | 10/2013 | Osawa | |
| 2018/0361589 | A1* | 12/2018 | Paquin | B25J 9/1697 |

FOREIGN PATENT DOCUMENTS

| JP | 6046905 B2 | 12/2016 |
|---|---|---|
| KR | 20010026698 A | 4/2001 |
| KR | 100665874 B1 | 1/2007 |
| KR | 20100044636 A | 4/2010 |
| KR | 20180086646 A | 8/2018 |

* cited by examiner

*Primary Examiner* — Ahmed A Berhan
(74) *Attorney, Agent, or Firm* — LEMPIA SUMMERFIELD KATZ LLC (57) ABSTRACT

A device and a method reduce a backlight effect on a camera of a robot in consideration of a situation of the robot. The device acquires a surrounding image, communicates with a system of the robot to obtain a current state value of the robot, and calculates a parameter value of the camera based on the current state value of the robot. Thus, the device precisely corrects the parameter of the camera based on an environment where the robot is actually located, thereby reducing the backlight effect on the camera.

20 Claims, 5 Drawing Sheets

DEVICE AND METHOD FOR REDUCING BACKLIGHT EFFECT ON A CAMERA OF A ROBOT

CROSS-REFERENCE TO RELATED APPLICATION

This application claims the benefit of priority to Korean Patent Application No. 10-2021-0102738, filed in the Korean Intellectual Property Office on Aug. 4, 2021, the entire contents of which are incorporated herein by reference.

TECHNICAL FIELD

The present disclosure relates to a device and a method for reducing a backlight effect on a camera of a robot, and more particularly, to a device and a method for reducing a backlight effect on a camera of a robot in consideration of a situation of the robot.

BACKGROUND

When a camera is used to capture an image, sometimes, a backlight occurs. Thus, an image having poor information of an object is acquired. In order to reduce the backlight phenomenon, it is necessary to develop a scheme to correct a camera parameter. In particular, when the robot recognizes an image using a camera disposed in the robot and performs a role of vision of the robot, the backlight phenomenon may occur.

In particular, the backlight phenomenon may be somewhat reduced by a conventional technique of correcting the camera parameter based on luminance detected using the acquired image. However, this scheme does not perform precise control based on an actual environment. In many cases, the robot moves and operates within a limited service area. In this case, it is necessary to develop a scheme that performs sophisticated correction in consideration of the robot's current situation.

SUMMARY

The present disclosure has been made to solve the above-mentioned problems occurring in the prior art while advantages achieved by the prior art are maintained intact.

An embodiment of the present disclosure intends to provide a device and a method for reducing a backlight effect on a camera of a robot in consideration of a situation of the robot.

Another embodiment of the present disclosure intends to provide a device and a method for reducing a backlight effect on a camera of a robot by precisely correcting a parameter of the camera based on an environment in which the robot is actually located.

Still another embodiment of the present disclosure intends to provide a device and a method for reducing a backlight effect on a camera of a robot including adapting to an environment in which the robot is actually located. Thus, a camera parameter is corrected based on each environment, thereby increasing image quality.

Still yet another embodiment of the present disclosure intends to provide a device and a method for reducing a backlight effect on a camera of a robot including reducing backlight phenomenon in an image captured using the robot's camera. Thus, the robot's ability to secure vision may be improved.

Still yet another embodiment of the present disclosure intends to provide a device and a method for reducing a backlight effect on a camera of a robot including correcting various camera parameters of the robot camera. Thus, a quality of an image acquired using the robot camera may be improved.

The technical problems to be solved by the present disclosure are not limited to the aforementioned problems. Any other technical problems not mentioned herein should be clearly understood from the following description by those having ordinary skill in the art to which the present disclosure pertains.

According to one aspect, a device for reducing a backlight effect on a camera of a robot is provided. The device may include: the camera disposed in the robot to acquire a surrounding image; a communicator communicating with a system of the robot to obtain a current state value of the robot from the system; and a processor that calculates a parameter value of the camera based on the current state value of the robot.

In one embodiment, the parameter value of the camera may include at least one of exposure, gain, or white balance of the camera.

In one embodiment, the current state value of the robot may include a value related to at least one of a position of the robot or a direction toward which the camera faces.

In one embodiment, the processor may calculate the direction toward which the camera of the robot faces with respect to a reference direction, based on a direction toward which a front surface of the robot faces with respect to the reference direction and a direction toward which the camera of the robot faces with respect to the direction toward which the front surface of the robot faces.

In one embodiment, the processor may calculate the parameter value of the camera based on a current time.

In one embodiment, the processor may calculate the parameter value of the camera corresponding to the current state value of the robot, based on a preset lookup table based on optical characteristics of a service area of the robot.

In one embodiment, when a first lookup table value corresponding to the current state value of the robot is absent in the lookup table, the processor may calculate the parameter value of the camera, based on a lookup table value corresponding to a current state value of the robot adjacent to a current state value of the robot in which the first lookup table value is present.

In one embodiment, the processor may calculate the parameter value of the camera, based on an average luminance value of the surrounding image in which a weight is applied to an area of interest calculated from the acquired surrounding image.

In one embodiment, the processor may calculate the parameter value of the camera, based on a luminance value of the surrounding image in which a high luminance area calculated in a preset scheme is excluded from the acquired surrounding image.

In one embodiment, the processor may determine whether each of pixels constituting the surrounding image corresponds to the high luminance area, based on whether a sum of luminance values of surrounding pixels around each corresponding pixel in a preset scheme exceeds a reference value. The processor may also calculate the high luminance area based on the determination result.

In one embodiment, the processor may calculate the parameter value of the camera, based on a difference between an average value of weighted ones of luminance values calculated using the acquired surrounding image and a target value.

In accordance with another aspect, a method for reducing a backlight effect on a camera of a robot is provided. The method includes: acquiring, by the camera disposed in the robot, a surrounding image; acquiring, by a communicator communicating with a system of the robot, a current state value of the robot from the system; and calculating, by a processor, a parameter value of the camera, based on the current state value of the robot.

In one embodiment, the current state value of the robot may include a value related to at least one of a position of the robot or a direction toward which the camera faces. The method may further include calculating, by the processor, the direction toward which the camera of the robot faces with respect to a reference direction, based on a direction toward which a front surface of the robot faces with respect to the reference direction and a direction toward which the camera of the robot faces with respect to the direction toward which the front surface of the robot faces.

In one embodiment, the calculating, by the processor, of the parameter value of the camera may include calculating, by the processor, the parameter value of the camera based on a current time.

In one embodiment, the calculating, by the processor, of the parameter value of the camera may include calculating, by the processor, the parameter value of the camera corresponding to the current state value of the robot, based on a preset lookup table based on optical characteristics of a service area of the robot.

In one embodiment, the calculating, by the processor, of the parameter value of the camera corresponding to the current state value of the robot, based on the preset lookup table may include, when a first lookup table value corresponding to the current state value of the robot is absent in the lookup table, calculating, by the processor, the parameter value of the camera, based on a lookup table value corresponding to a current state value of the robot adjacent to a current state value of the robot in which the first lookup table value is present.

In one embodiment, the calculating, by the processor, of the parameter value of the camera may include calculating, by the processor, the parameter value of the camera, based on an average luminance value of the surrounding image in which a weight is applied to an area of interest calculated from the obtained surrounding image.

In one embodiment, the calculating, by the processor, of the parameter value of the camera may include calculating, by the processor, the parameter value of the camera, based on a luminance value of the surrounding image in which a high luminance area calculated in a preset scheme is excluded from the obtained surrounding image.

In one embodiment, the calculating, by the processor, of the parameter value of the camera may include determining, by the processor, whether each of pixels constituting the surrounding image corresponds to the high luminance area, based on whether a sum of luminance values of surrounding pixels around each corresponding pixel in a preset scheme exceeds a reference value, and may include calculating, by the processor, the high luminance area based on the determination result.

In one embodiment, the calculating, by the processor, of the parameter value of the camera may include calculating, by the processor, the parameter value of the camera, based on a difference between an average value of weighted ones of luminance values calculated using the obtained surrounding image and a target value.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function has been omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components. The terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. Such terms should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, with reference to FIGS. 1-5, embodiments of the present disclosure are described in detail.

Figure 1:
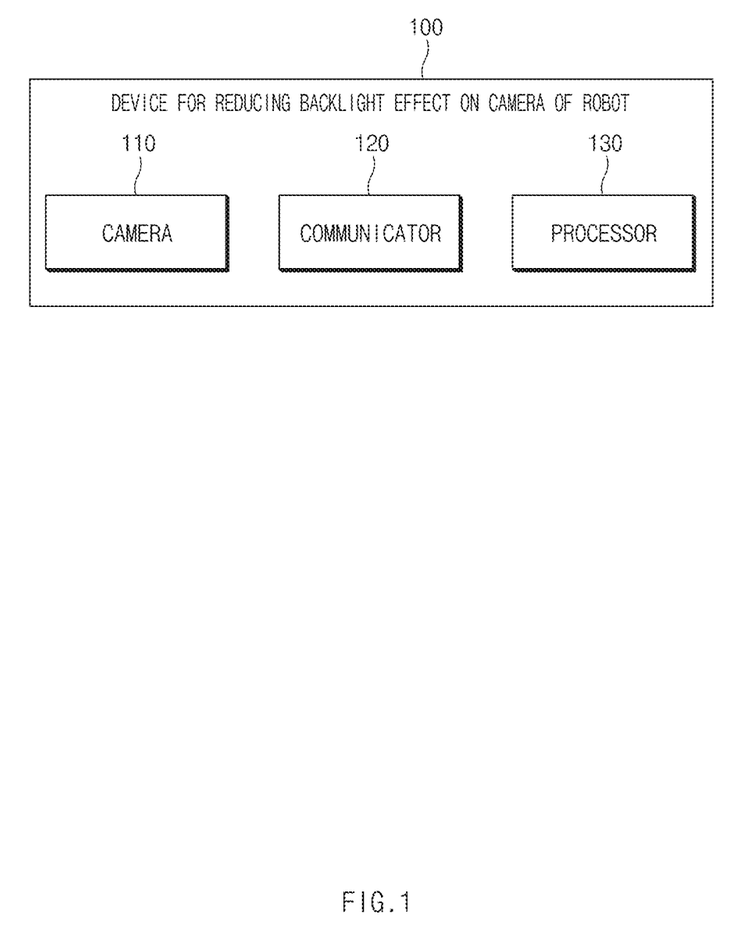
FIG. 1 is a block diagram showing a device for reducing a backlight effect on a camera of a robot according to an embodiment of the present disclosure.

FIG. 1 is a block diagram showing a device for reducing a backlight effect on a camera of a robot according to an embodiment of the present disclosure.

Referring to FIG. 1, a device 100 for reducing a backlight effect on a camera of a robot may include a camera 110, a communicator 120, and a processor 130.

The device 100 for reducing a backlight effect on a camera of a robot according to the present disclosure may be implemented inside the robot. In this connection, the device 100 for reducing a backlight effect on a camera of a robot may be formed integrally with internal control units of the robot or may be implemented as a separate hardware device. The device 100 may also be connected to control units of a vehicle via connection means.

In one example, the device 100 for reducing a backlight effect on a camera of a robot may be implemented integrally with the robot or may be implemented in a manner in which the device 100 is installed/attached to the vehicle as a component separate from the robot. Alternatively, the device 100 for reducing a backlight effect on a camera of a robot may be implemented such that a portion thereof may be implemented integrally with the robot while the other portion thereof may be installed/attached to the vehicle as a component separate from the robot.

The camera 110 may be disposed in the robot to acquire a surrounding image.

In one example, the camera 110 may be disposed on a head of the robot to obtain an image in a direction toward which the head of the robot faces.

In one example, the camera 110 may be electrically connected to the processor 130, may be controlled by the processor 130, and may transmit information about the acquired image to the processor 130.

The communicator 120 may communicate with a system of the robot to obtain a current state value of the robot.

In one example, the communicator 120 may communicate using the system of the robot over an internal communication network of the robot.

In one example, the communicator 120 may be connected to the system of the robot using wired or wireless communication and thus may obtain the current state value of the robot from the system of the robot.

The current state value of the robot may include a value related to at least one of the robot's position or a direction toward which the camera 110 faces.

In one example, the communicator 120 may be connected to a driving system of the robot and may obtain, from the robot's driving system, information about a direction toward which a front surface of the robot faces with respect to a reference direction and a direction toward which the camera of the robot faces with respect to the direction toward which the front surface of the robot faces.

In one example, the communicator 120 may be connected to the processor 130 using wireless or wired communication and may transmit the acquired current state value of the robot to the processor 130.

The processor 130 may be electrically connected to the camera 110, the communicator 120, and other components of the robot and may electrically control each of the components. The processor 130 may be embodied as an electrical circuit executing instructions of software and thus may perform various data processing and calculations.

The processor 130 may calculate the parameter value of the camera 110 based on the current state value of the robot.

In one example, the parameter value of the camera 110 may include at least one of exposure, gain, or white balance of the camera 110.

Further, the parameter value of the camera 110 may include any other parameter value that may reduce the backlight phenomenon or affect performance of the image of the camera 110.

In one example, the processor 130 may calculate a direction toward which the robot's camera faces with respect to a reference direction, based on the direction toward which the robot's front surface faces with respect to the reference direction and the direction toward which the robot's camera faces with respect to the direction toward which the robot's front surface faces.

In one example, the processor 130 may calculate the direction toward which the robot's camera faces with respect to a reference direction, based on a sum of an angle corresponding to the direction toward which the robot's front surface faces with respect to the reference direction and an angle corresponding to the direction toward which the robot's camera faces with respect to the direction toward which the robot's front surface faces.

In another example, the processor 130 may calculate the direction toward which the camera 110 of the robot faces in consideration of a reference position of the robot.

In one example, the processor 130 may calculate the parameter value of the camera 110 in consideration of a current time.

In one example, the processor 130 may calculate the parameter value of the camera 110 corresponding to the current state value of the robot, using a preset lookup table formulated in consideration of optical characteristics of a service area of the robot.

Specifically, the processor 130 may calculate the parameter value of the camera 110 corresponding to the current state value of the robot, using a lookup table based on the current time and a lookup table based on the current direction of the camera 110.

In one example, the processor 130 may calculate an initial parameter value of the parameter of the camera 110 using the lookup table based on the current time and the lookup table based on the current direction of the camera 110. The processor 130 then may calculate the parameter value of the camera 110, based on the calculated initial parameter value.

In one example, the processor 130 may calculate a lookup table value corresponding to the current state value of the robot using lookup tables, such as the below [Table 1] and [Table 2].

TABLE 1

| Time (t) | 0 o'clock | 6 o'clock | 12 o'clock | 18 o'clock |
|---|---|---|---|---|
| Exposure value (p) | 60 | 40 | 20 | 30 |

TABLE 2

| Angle (θ) | 0° | 60° | 120° | 180° |
|---|---|---|---|---|
| Weight | 1.0 | 0.8 | 0.3 | 0 |

[Table 1] is a lookup table including information on an exposure value p based on a time (t). [Table 2] is a lookup table including information on a weight based on an angle (θ).

In one example, when a lookup table value corresponding to the current state value of the robot is absent in the lookup table, the processor 130 may calculate the parameter value of the camera 110 based on a lookup table value corresponding to the current state value of the robot adjacent to a current state value of the robot in which the corresponding lookup table value is present.

Specifically, the processor 130 may calculate the parameter value of the camera 110, using linear interpolation or bi-linear interpolation based on the lookup table value corresponding to the current state value of the robot adjacent to the current state value of the robot in which the corresponding lookup table value is present.

In one example, when the current time is 11 o'clock, times adjacent to 11 o'clock and having corresponding lookup table values are 6 o'clock and 12 o'clock. In this case, the processor 130 may apply the linear interpolation to 40 of the exposure value corresponding to 6 o'clock and 20 of the exposure value corresponding to 12 o'clock and thus may calculate the parameter value based on the time using p_time=(p1*(12−11)+p2*(11−6))/6=23.3.

In this connection, p_time means a parameter value of the exposure based on the time, p1 may be 40 of the exposure value corresponding to 6 o'clock adjacent to 11 o'clock, and p2 may be 20 of the exposure value corresponding to 12 o'clock adjacent to 11 o'clock.

Further, in one example, when a current direction of the camera 110 is 45° with respect to the reference direction, angles adjacent to 45° and having corresponding lookup table values are 60° and 120°. In this case, the processor 130 may apply the linear interpolation to 0.8 as a weight corresponding to 60° and 0.3 as a weight corresponding to 120°. The processor 130 thus may calculate the weight based on the direction of the camera 110 using W_θ=(1.0*(60−45)+0.8*(45−0))/60=0.85.

In this connection, W_means the weight based on the direction of the camera 110.

The processor 130 may calculate a last initial parameter value, based on an arbitrarily set initial parameter preset value, the parameter value of the camera 110 calculated using the lookup table based on the time, and the weight calculated using the lookup table based on the direction of the camera 110.

In one example, the processor 130 may calculate the last initial parameter value using an equation: p_init=W_θ*p_time+(1−W_θ)*p_preset.

In this connection, p_init means the last initial parameter value, and p_preset means the arbitrarily set initial parameter preset value.

The last initial parameter value means a parameter value calculated based on the lookup tables based on the time and/or the direction of the camera 110, before the processor 130 analyzes the acquired image and thus calculates a correction value for the parameter of the camera 110.

The processor 130 may analyze the acquired image to calculate the correction value for the parameter and calculate a last parameter value of the camera 110 based on the calculated correction value and the initial parameter value.

In one example, the processor 130 may obtain the parameter correction value based on average luminance of an acquired surrounding image in which a weight is applied to an area of interest calculated from the acquired surrounding image. Thus, the processor 130 may calculate a parameter value of the camera 110 based on the parameter correction value.

In one example, the processor 130 may obtain the parameter correction value based on the luminance of a surrounding image in which a high luminance area calculated in a preset scheme is excluded from the acquired surrounding image. The processor 130 may calculate the parameter value of the camera 110 based on the correction value.

In one example, the processor 130 may determine whether each of pixels constituting the surrounding image corresponds to the high luminance area, based on whether a sum of luminance of surrounding pixels around the corresponding pixel in a preset scheme exceeds a reference value. Thus, the processor 130 may calculate the high luminance area.

In one example, in order to determine whether the pixel corresponds to the high luminance area, the processor 130 may perform a following operation. When each of pixels-specific intensity of the image exceeds a first reference value, the processor 130 may set a bitmap index value of the corresponding pixel to 1. When each of pixels-specific intensity of the image does not exceed the first reference value, the processor 130 may set the bitmap index value of the corresponding pixel to 0.

Further, the processor 130 may determine a range of the surrounding pixels around each of pixels of the image in a preset scheme. Then, the processor 130 may determine whether the corresponding pixel corresponds to the high luminance area, based on whether the sum of the bitmap index values of the determined surrounding pixels around the corresponding pixel exceeds a second reference value.

A process in which the processor 130 calculates the high luminance area may be described with reference to [Equation 1] below.

$$b_p = \begin{cases} 1, & \text{if } I_p > TH_1 \\ 0, & \text{else} \end{cases} \quad \text{[Equation 1]}$$

$$p' \in R_{high} \left( \text{if } \sum_{p' \in P'} b_{p'} > TH_2 \right)$$

In the above [Equation 1], $b_p$ means a bitmap index value of a pixel p, $I_p$ means an intensity of the pixel p, $TH_1$ means the first reference value, $R_{high}$ means the high luminance area, and $TH_2$ means the second reference value.

$I_p$ may be applied to various pixel values such as a luminance value of a pixel, an average value of weighted RGB values, and a max value, according to embodiments.

In one example, the processor 130 may calculate the parameter correction value based on a difference between the weighted average value of the luminance calculated using the acquired surrounding image and a target value. Then, the processor 130 may calculate the parameter value of the camera 110 based on the correction value.

The processor 130 may apply, to the area of interest, a weight larger than that applied to other areas than the area of interest. The processor 130 thus may calculate a weighted average of the luminance of the acquired image.

In one example, a process in which the processor 130 calculates the weighted average of the luminance of the acquired image may be described with reference to [Equation 2] below.

$$I_{avg} = \sum_{I_p} W_p \times I_p \quad \text{[Equation 2]}$$

$$W_p = \begin{cases} W_{ROI_{vision}}, & \text{if } p \in ROI_{vision} \\ 0, & \text{if } p \in R_{high} \\ 1, & \text{otherwise} \end{cases}$$

In the above [Equation 2], $I_{avg}$ means the weighted average of the luminance of the acquired image, $I_p$ means a luminance value of a pixel, and $W_p$ means a weight. $W_p$ may vary depending on whether the pixel p is contained in the area of interest, whether the pixel p is contained in the high luminance area, and whether the pixel p is not contained in any one of the area of interest and the high luminance area. $ROI_{vision}$ means the area of interest, and $R_{high}$ means the high luminance area.

In one example, in order to apply, to the area of interest, a weight larger than that applied to other areas than the area of interest, $WROI_{vision}$ may be set to a value greater than 1.

The processor 130 may calculate the parameter correction value based on the calculated weighted average of the luminance of the image and a target luminance.

A process in which the processor 130 calculates the parameter correction value based on the calculated weighted average of the image luminance and the target luminance may be described with reference to [Equation 3] below.

$$p_{fine} = W_{index}(I_{avg} - I_{target})$$ [Equation 3]

In the above [Equation 3], $p_{fine}$ means the parameter correction value, $W_{index}$ is a preset arbitrary constant value, and $I_{target}$ means the target luminance.

The processor 130 may calculate a last parameter value of the camera 110 based on a sum of the initial parameter value and the parameter correction value.

A process in which the processor 130 calculates the last parameter value of the camera 110 based on the sum of the initial parameter value and the parameter correction value may be described with reference to [Equation 4] below.

$$p_{final} = p_{init} + p_{fine}$$ [Equation 4]

In the above [Equation 4], $p_{final}$ means a parameter value of the last camera 110.

Calculating the parameter value by the device 100 for reducing a backlight effect on a camera of a robot has been described above based on the luminance. Calculating the parameter value by the device 100 for reducing a backlight effect on a camera of a robot may be applied to various pixel values such as an average value of weighted RGB values, a max value, and the like according to embodiments.

Figure 2:
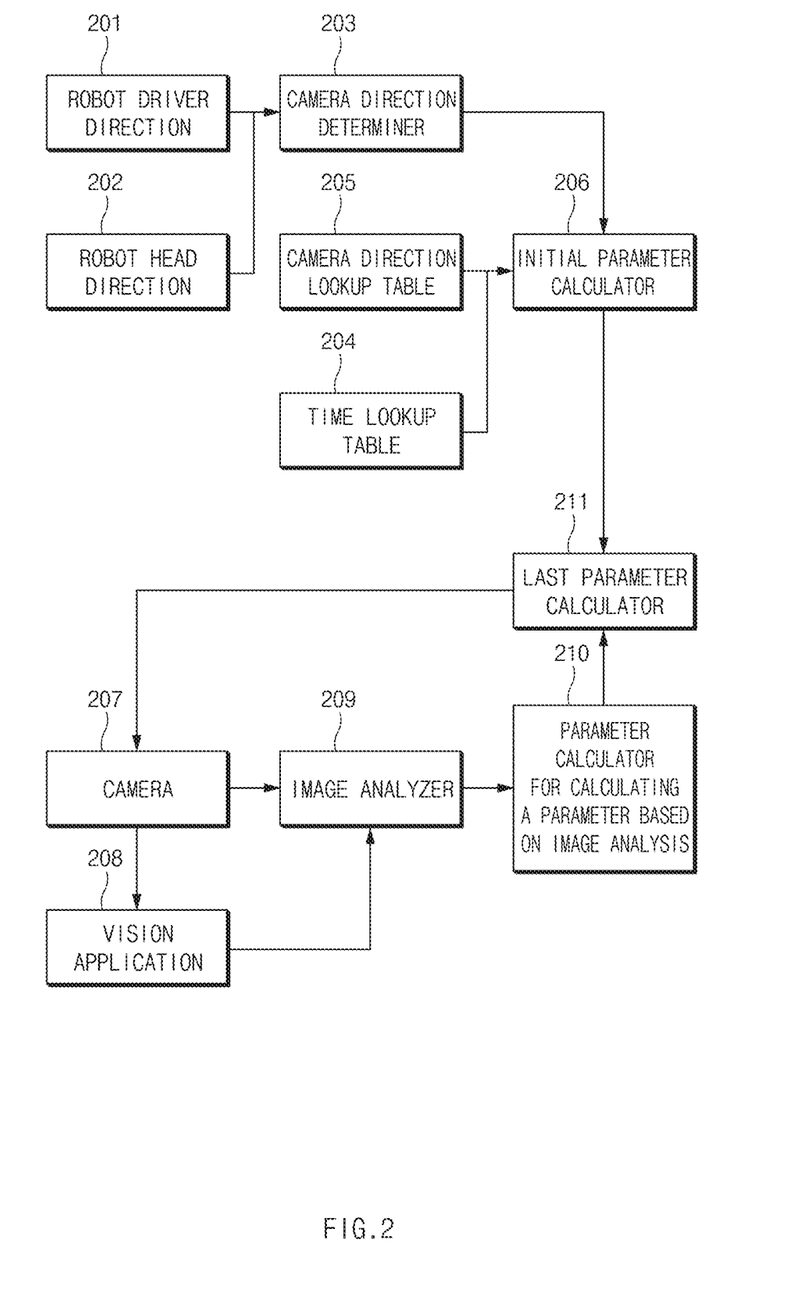
FIG. 2 is a diagram specifically showing a device for reducing a backlight effect on a camera of a robot according to an embodiment of the present disclosure.

FIG. 2 is a diagram specifically showing a device for reducing a backlight effect on a camera of a robot according to an embodiment of the present disclosure.

A camera direction determiner 203, an initial parameter calculator 206, an image analyzer 209, a parameter calculator 210 for calculating a parameter based on image analysis, and a last parameter calculator 211 are included in one or more processors 110 shown in FIG. 1. These elements may perform functionally or structurally separate functions to be described below.

The camera direction determiner 203 may calculate a direction the camera of the robot faces, based on a robot driver direction 201 and a robot head direction 202.

In one example, the camera direction determiner 203 may obtain information about the robot driver direction 201 and the robot head direction 202 from the robot system.

The robot driver direction 201 means a direction toward which the front surface of the robot faces with respect to the reference direction. The robot head direction 202 means a direction toward which the camera of the robot faces with respect to the direction toward which the front surface of the robot faces.

In one example, the camera direction determiner 203 may calculate the direction of a camera 207, based on a sum of an angle corresponding to the direction toward which the robot's front surface faces with respect to the reference direction and an angle corresponding to the direction toward which the robot's camera faces with respect to the direction toward which the robot's front surface faces.

In one example, the camera direction determiner 203 may transmit information about the calculated direction of the camera 207 to the initial parameter calculator 206.

The initial parameter calculator 206 may calculate the initial parameter value of the camera based on the direction of the camera 207, a camera direction lookup table 205, and a time lookup table 204.

In one example, the initial parameter calculator 206 may calculate the exposure value based on the time using the time lookup table 204 and based on the current time. The initial parameter calculator 206 may calculate the weight based on the angle based on the direction of the camera 207 and the camera direction lookup table 205.

In one example, the initial parameter calculator 206 may calculate the initial parameter value, based on the calculated exposure value based on the time and the calculated weight based on the angle.

In one example, the initial parameter calculator 206 may deliver the calculated initial parameter value to the last parameter calculator 211.

The camera 207 may be disposed in the robot, may acquire the surrounding image, and may transmit the acquired surrounding image to a vision application and the image analyzer 209.

A vision application 208 may calculate the area of interest from the acquired image in a preset scheme and may transmit information about the calculated area of interest to the image analyzer 209.

The image analyzer 209 may calculate a weighted average luminance index based on the acquired surrounding image and information about the calculated area of interest.

In one example, the image analyzer 209 may apply, to each of pixels, a weight based on whether the pixel is included in the area of interest, whether the pixel is included in the high luminance area, and whether the pixel is not included in any one of the area of interest or the high luminance area. Thus, the image analyzer 209 may calculate a weighted average of luminance values.

In one example, the image analyzer 209 may determine whether the pixel corresponds to the high luminance area, based on whether the sum of the luminance values of the surrounding pixels around the pixel in the preset scheme exceeds the reference value.

In one example, the image analyzer 209 may transmit the calculated weighted average luminance index to the parameter calculator 210 for calculating the parameter based on image analysis.

The parameter calculator 210 for calculating the parameter based on image analysis may calculate the parameter correction value based on image analysis, based on a difference between the calculated weighted average luminance index and a target luminance.

In one example, the parameter calculator 210 for calculating the parameter based on image analysis may multiply the difference between the calculated weighted average luminance index and the target luminance by a preset coefficient and thus may calculate the parameter correction value based on image analysis.

In one example, the parameter calculator 210 for calculating the parameter based on the image analysis may transmit the parameter correction value based on the calculated image analysis to the last parameter calculator 211.

The last parameter calculator 211 may calculate the last parameter value of the camera 207 based on the initial parameter value and the parameter correction value based on the image analysis.

In one example, the last parameter calculator 211 may adjust the parameter of the camera 207 based on the calculated last parameter value of the camera 207.

Figure 3:
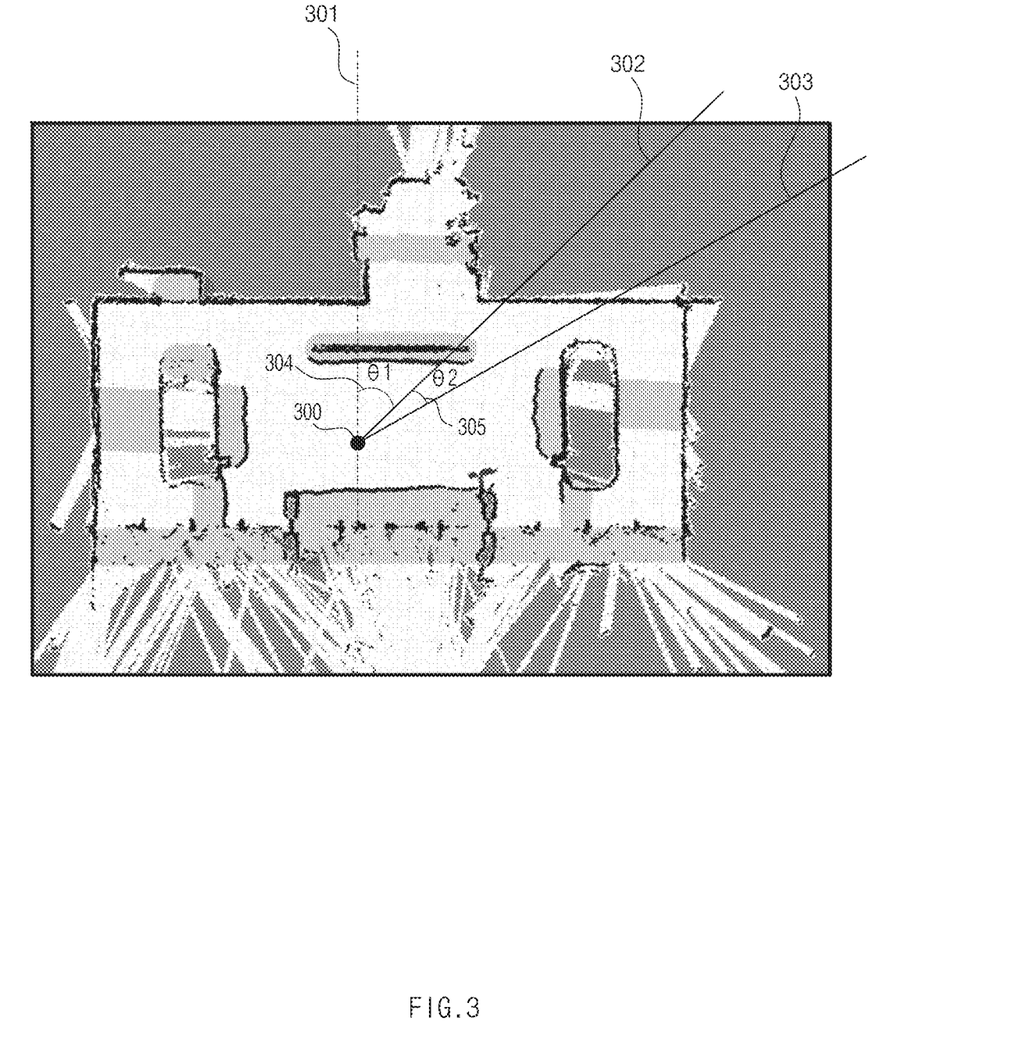
FIG. 3 is a diagram showing that a device for reducing a backlight effect on a camera of a robot according to an embodiment of the present disclosure calculates a direction toward which a camera of the robot faces.

FIG. 3 is a diagram showing that the device for reducing a backlight effect on a camera of a robot according to an embodiment of the present disclosure calculates the direction toward which the robot's camera faces.

Referring to FIG. 3, a reference direction 301 may be set in a service area of a robot 300.

In one example, the device 100 for reducing a backlight effect on a camera of the robot 300 may obtain, from the robot system, information about a direction 302 toward which the front surface of the robot faces with respect to the reference direction 301 and a direction 303 toward which the camera of the robot faces with respect to the direction 302 toward which the front surface of the robot faces.

In one example, the device 100 for reducing a backlight effect on a camera of the robot 300 may calculate an angle 304 and θ1 corresponding to the direction 302 toward which the front surface of the robot faces with respect to the reference direction 301. The device 100 may also calculate an angle 305 and θ2 corresponding to the direction 303 toward which the camera of the robot faces with respect to the direction 302 toward which the front surface of the robot faces and then calculate a direction 303 toward which the camera of the robot faces with respect to the reference direction.

The device 100 for reducing a backlight effect on a camera of the robot 300 may calculate a sum of the angle 304 and θ1 corresponding to the direction 302 toward which the front surface of the robot faces with respect to the reference direction 301, and the angle 305 and θ2 corresponding to the direction 303 toward which the camera of the robot faces with respect to the direction 302 toward which the front surface of the robot faces. Thus, the device 100 may calculate the direction 303 toward which the camera of the robot faces with respect to the reference direction 301, based on the sum.

Figure 4:
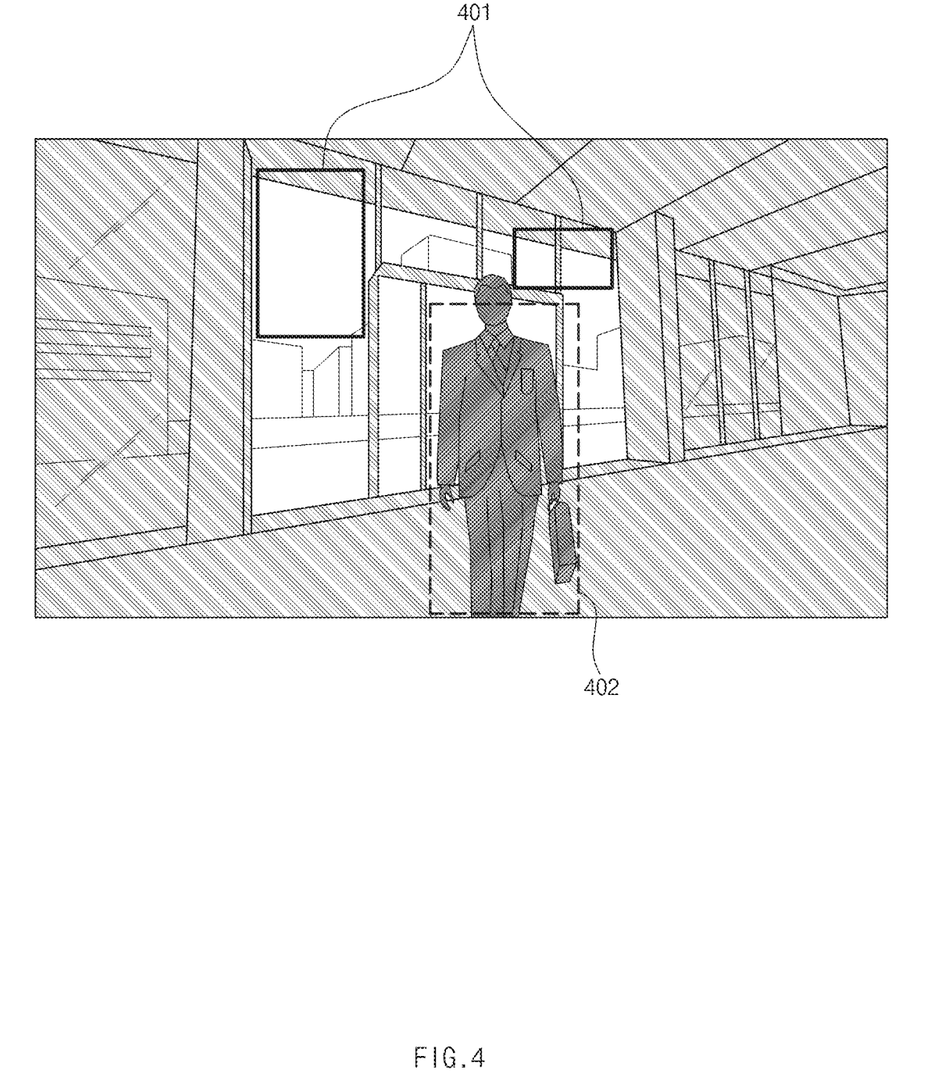
FIG. 4 is a diagram showing that a device for reducing a backlight effect on a camera of a robot according to an embodiment of the present disclosure calculates a parameter value of the camera based on luminance.

FIG. 4 is a diagram showing that a device for reducing a backlight effect on a camera of a robot according to an embodiment of the present disclosure calculates a parameter value of the camera based on a luminance value.

The device 100 for reducing a backlight effect on a camera of a robot may extract a high luminance area 401 and an area of interest 402 from the acquired robot surrounding image.

In one example, the device 100 for reducing a backlight effect on a camera of a robot may determine whether each of pixels constituting an image belongs to a high luminance area based on a pixel-specific luminance value.

In one example, the device 100 for reducing a backlight effect on a camera of a robot may recognize a specific object, a person, and/or a face of a person in the image and extract areas corresponding thereto.

In one example, when functions such as conventional automatic adjustment of a camera exposure are used, the area of interest 402 may be detected, but may be observed as having a dark state due to the backlight.

In FIG. 4, in an image taken using the camera disposed in the robot that provides the service while the camera is located indoors, a window area may be detected as a high luminance area due to light incoming from a space out of a window. An area of a person present in an indoor space may be detected as the area of interest. However, the area of interest may be detected as having a dark state due to the backlight.

The device 100 for reducing a backlight effect on a camera of a robot may consider this robot environment to calculate the parameter value of the camera and may adjust the camera based on the calculated parameter value. Thus, the robot's camera may acquire high-recognition images, which may improve the robot's vision-related functions.

Figure 5:
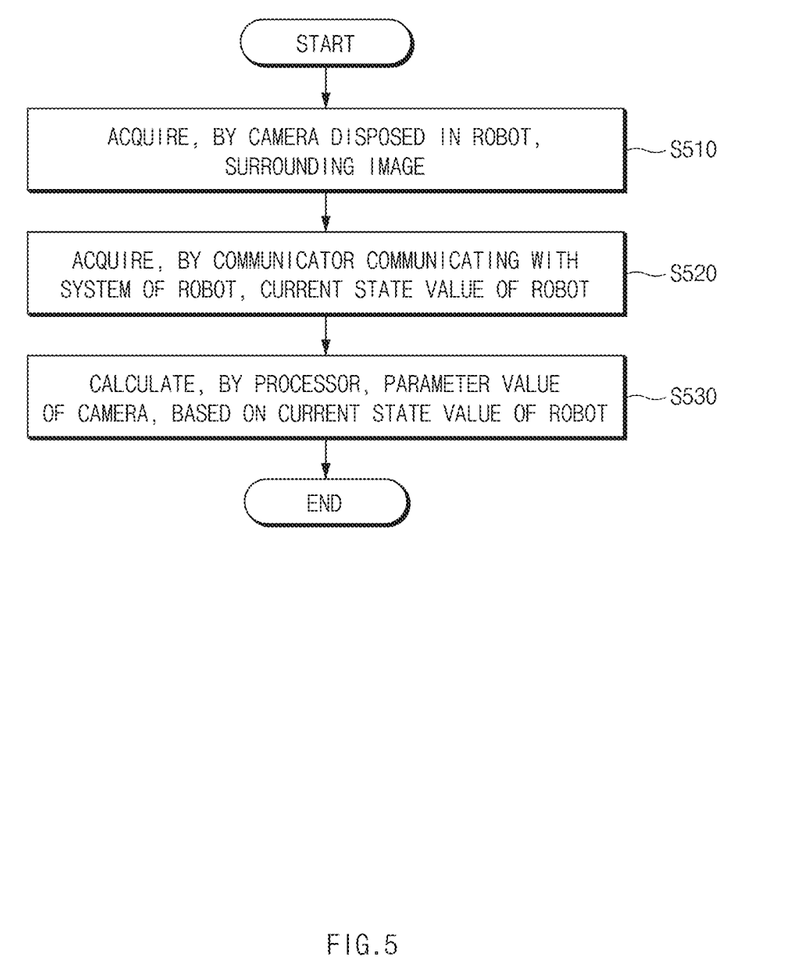
FIG. 5 is a flowchart showing a method for reducing a backlight effect on a camera of a robot according to an embodiment of the present disclosure.

FIG. 5 is a flowchart showing a method for reducing a backlight effect on a camera of a robot according to an embodiment of the present disclosure.

Referring to FIG. 5, the method for reducing a backlight effect on a camera of a robot may include a step S510 of acquiring, by the camera 110 disposed in the robot, the surrounding image. The method may also include a step S520 in which the communicator 120 communicates with the system of the robot and obtains the current state value of the robot therefrom. The method may further include a step S530 of calculating, by the processor 130, the parameter value of the camera 110, based on the current state value of the robot.

Although FIG. 5 shows that the steps are performed in the order of S510, S520, and S530, the present disclosure is not limited thereto. The method for reducing a backlight effect on a camera of a robot includes the steps as shown. However, the order may be implemented in a different manner as that shown in FIG. 5 and some of the steps may be performed simultaneously, depending on embodiments.

The step S510 of acquiring, by the camera 110 disposed in the robot, the surrounding image may include a step in which the camera 110 acquires the surrounding image and delivers the image to the processor 130.

The step S520 in which the communicator 120 communicates with the system of the robot and obtains the current state value of the robot therefrom may include a step in which the communicator 120 communicates with the robot's system and acquires, therefrom, the current state value of the robot including a value related to at least one of the robot's position or the direction toward which the camera 110 faces.

Although not shown, the method for reducing a backlight effect on a camera of a robot may further include calculating, by the processor 130, the direction toward which the robot's camera 110 faces with respect to the reference direction, based on the direction toward which the robot's front surface faces with respect to the reference direction and the direction toward which the robot's camera 110 faces with respect to the direction toward which the robot's front surface faces.

The step S530 of calculating, by the processor 130, the parameter value of the camera 110 based on the current state value of the robot may include a step in which the processor 130 calculates the parameter value of the camera 110 in consideration of the current time.

In one example, the step S530 of calculating, by the processor 130, the parameter value of the camera 110 based on the current state value of the robot may include a step in which the processor 130 calculates the parameter value of the camera 110 corresponding to the current state value of the robot, using a preset lookup table formulated in consideration of optical characteristics of a service area of the robot.

In one example, a step in which the processor 130 calculates the parameter value of the camera 110 corresponding to the current state value of the robot, using the preset lookup table, may include a step in which, when a lookup table value corresponding to the current state value of the robot is absent in the lookup table, the processor 130 calculates the parameter value of the camera 110 based on a lookup table value corresponding to the current state value of the robot adjacent to a current state value of the robot in which the corresponding lookup table value is present.

In one example, the step S530 in which the processor 130 calculates the parameter value of the camera 110 based on the current state value of the robot may include a step in which the processor 130 calculates the parameter value of the camera 110, based on average luminance of an acquired surrounding image in which a weight is applied to an area of interest calculated from the acquired surrounding image.

In one example, the step S530 in which the processor 130 calculates the parameter value of the camera 110 based on the current state value of the robot may include a step in which the processor 130 calculates the parameter value of the camera 110, based on the luminance of a surrounding image in which a high luminance area calculated in a preset scheme is excluded from the acquired surrounding image.

In one example, the step S530 in which the processor 130 calculates the parameter value of the camera 110 based on the current state value of the robot may include a step in which the processor 130 determines whether each of pixels constituting the surrounding image corresponds to the high luminance area, based on whether a sum of luminance of surrounding pixels around the corresponding pixel in a preset scheme exceeds a reference value. Thus, the processor 130 calculates the high luminance area based on the determination result.

In one example, the step S530 in which the processor 130 calculates the parameter value of the camera 110 based on the current state value of the robot may include a step in which the processor 130 calculates the parameter value of the camera 110, based on a difference between the weighted average value of the luminance calculated using the acquired surrounding image and a target value.

The operations of the method or the algorithm described in connection with the embodiments disclosed herein may be embodied directly in hardware or a software module executed by the processor 130 or embodied in a combination thereof. The software module may reside on a storage medium (i.e., the memory and/or the storage) such as a RAM, a flash memory, a ROM, an EPROM, an EEPROM, a register, a hard disk, a removable disk, and a CD-ROM.

The storage medium is coupled to the processor 130, which may read information from and write information to the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above merely illustrates the technical idea of the present disclosure. Various modifications and changes may be made by those having ordinary skill in the art without departing from the essential characteristics of the present disclosure.

Therefore, the embodiments disclosed in the present disclosure are not intended to limit the technical idea of the present disclosure but instead to illustrate the present disclosure. The scope of the technical idea of the present disclosure is not limited by the embodiments. The scope of the present disclosure should be construed as being covered by the scope of the appended claims. All technical ideas falling within the scope of the claims should be construed as being included in the scope of the present disclosure.

The effects of the device and the method for reducing the backlight effect on the camera of the robot according to the present disclosure are as follows.

According to at least one of the embodiments of the present disclosure, the device and the method for reducing a backlight effect on a camera of a robot in consideration of a situation of the robot may be realized.

According to at least one of the embodiments of the present disclosure, the device and the method for reducing a backlight effect on a camera of a robot may precisely correct a parameter of the camera based on an environment in which the robot is actually located.

According to at least one of the embodiments of the present disclosure, the device and the method for reducing a backlight effect on a camera of a robot may include adapting to an environment in which the robot is actually located and thus may correct a camera parameter based on each environment. By such a device and a method, increasing image quality may be realized.

According to at least one of the embodiments of the present disclosure, the device and the method for reducing a backlight effect on a camera of a robot may include reducing backlight phenomenon in an image captured using the robot's camera. By such a device and a method, improving the robot's ability to secure vision may be realized.

According to at least one of the embodiments of the present disclosure, the device and the method for reducing a backlight effect on a camera of a robot may include correcting various camera parameters of the robot camera. By such a device and a method, improving a quality of an image acquired using the robot camera may be realized.

In addition to the above effects, various effects that are directly or indirectly identified from the present disclosure may be appreciated.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A device for reducing a backlight effect on a camera of a robot, the device comprising:
    the camera disposed in the robot to acquire a surrounding image;
    a communicator communicating with a system of the robot to obtain a current state value of the robot from the system; and
    a processor configured to calculate a parameter value of the camera based on the current state value of the robot,
    wherein the processor is configured to calculate the parameter value of the camera corresponding to the current state value of the robot, based on a preset lookup table based on optical characteristics of a service area of the robot,
    wherein, when a first lookup table value corresponding to the current state value of the robot is absent in the lookup table, the processor is configured to calculate the parameter value of the camera, based on a second lookup table value corresponding to a current state value of the robot adjacent to the current state value of the robot, and
    wherein the second lookup table value is present in the lookup table.

2. The device of claim 1, wherein the parameter value of the camera includes at least one of exposure, gain, or white balance of the camera.

3. The device of claim 1, wherein the current state value of the robot includes a value related to at least one of a position of the robot or a direction toward which the camera faces.

4. The device of claim 3, wherein the processor is configured to calculate the direction toward which the camera of the robot faces with respect to a reference direction, based on a direction toward which a front surface of the robot faces with respect to the reference direction and a direction toward which the camera of the robot faces with respect to the direction toward which the front surface of the robot faces.

5. The device of claim 1, wherein the processor is configured to calculate the parameter value of the camera based on a current time.

6. The device of claim 1, wherein the processor is configured to calculate the parameter value of the camera, based on an average luminance value of the surrounding image in which a weight is applied to an area of interest calculated from the acquired surrounding image.

7. The device of claim 1, wherein the processor is configured to calculate the parameter value of the camera, based on a luminance value of the surrounding image in which a high luminance area calculated in a preset scheme is excluded from the acquired surrounding image.

8. The device of claim 7, wherein the processor is configured to determine whether each of pixels constituting the surrounding image corresponds to the high luminance area, based on whether a sum of luminance values of surrounding pixels around each corresponding pixel in a preset scheme exceeds a reference value, and wherein the processor is configured to calculate the high luminance area based on the determination result.

9. The device of claim 1, wherein the processor is configured to calculate the parameter value of the camera, based on a difference between an average value of weighted ones of luminance values calculated using the acquired surrounding image and a target value.

10. A method for reducing a backlight effect on a camera of a robot, the method comprising:
acquiring, by the camera disposed in the robot, a surrounding image;
acquiring, by a communicator communicating with a system of the robot, a current state value of the robot from the system; and
calculating, by a processor, a parameter value of the camera, based on the current state value of the robot,
wherein the calculating, by the processor, of the parameter value of the camera includes calculating, by the processor, the parameter value of the camera corresponding to the current state value of the robot, based on a preset lookup table based on optical characteristics of a service area of the robot,
wherein the calculating, by the processor, of the parameter value of the camera corresponding to the current state value of the robot, based on the preset lookup table includes, when a first lookup table value corresponding to the current state value of the robot is absent in the lookup table, calculating, by the processor, the parameter value of the camera, based on a second lookup table value corresponding to a current state value of the robot adjacent to the current state value of the robot, and
wherein the second lookup table value is present in the lookup table.

11. The method of claim 10, wherein the current state value of the robot includes a value related to at least one of a position of the robot or a direction toward which the camera faces, and
wherein the method further comprises calculating, by the processor, the direction toward which the camera of the robot faces with respect to a reference direction, based on a direction toward which a front surface of the robot faces with respect to the reference direction and a direction toward which the camera of the robot faces with respect to the direction toward which the front surface of the robot faces.

12. The method of claim 10, wherein the calculating, by the processor, of the parameter value of the camera includes:
calculating, by the processor, the parameter value of the camera based on a current time.

13. The method of claim 10, wherein the calculating, by the processor, of the parameter value of the camera includes:
calculating, by the processor, the parameter value of the camera, based on an average luminance value of the surrounding image in which a weight is applied to an area of interest calculated from the obtained surrounding image.

14. The method of claim 10, wherein the calculating, by the processor, of the parameter value of the camera includes:
calculating, by the processor, the parameter value of the camera, based on a luminance value of the surrounding image in which a high luminance area calculated in a preset scheme is excluded from the obtained surrounding image.

15. The method of claim 14, wherein the calculating, by the processor, of the parameter value of the camera includes:
determining, by the processor, whether each of pixels constituting the surrounding image corresponds to the high luminance area, based on whether a sum of luminance values of surrounding pixels around each corresponding pixel in a preset scheme exceeds a reference value; and
calculating, by the processor, the high luminance area based on the determination result.

16. The method of claim 10, wherein the calculating, by the processor, of the parameter value of the camera includes:
calculating, by the processor, the parameter value of the camera, based on a difference between an average value of weighted ones of luminance values calculated using the obtained surrounding image and a target value.

17. A device for reducing a backlight effect on a camera of a robot, the device comprising:
the camera disposed in the robot to acquire a surrounding image;
a communicator communicating with a system of the robot to obtain a current state value of the robot from the system; and
a processor configured to calculate a parameter value of the camera based on the current state value of the robot,
wherein the processor is configured to calculate the parameter value of the camera, based on a difference between an average value of weighted ones of luminance values calculated using the acquired surrounding image and a target value.

18. The device of claim 17, wherein the parameter value of the camera includes at least one of exposure, gain, or white balance of the camera.

19. The device of claim 17, wherein the current state value of the robot includes a value related to at least one of a position of the robot or a direction toward which the camera faces.

20. The device of claim 19, wherein the processor is configured to calculate the direction toward which the camera of the robot faces with respect to a reference direction, based on a direction toward which a front surface of the robot faces with respect to the reference direction and a direction toward which the camera of the robot faces with respect to the direction toward which the front surface of the robot faces.

\* \* \* \* \*